United States Patent
Nigro

(10) Patent No.: US 10,782,970 B1
(45) Date of Patent: Sep. 22, 2020

(54) SCALABLE MULTI-PRODUCER AND SINGLE-CONSUMER PROGRESSIVE CHUNKED QUEUE

(71) Applicant: Red Hat, Inc., Raleigh, NC (US)

(72) Inventor: Francesco Nigro, Milan (IT)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/573,585

(22) Filed: Sep. 17, 2019

(51) Int. Cl.
*G06F 3/00* (2006.01)
*G06F 9/30* (2018.01)
*G06F 9/48* (2006.01)
*G06F 9/38* (2018.01)
*G06F 9/54* (2006.01)
*G06F 3/06* (2006.01)

(52) U.S. Cl.
CPC .......... *G06F 9/3004* (2013.01); *G06F 3/0644* (2013.01); *G06F 9/3836* (2013.01); *G06F 9/48* (2013.01); *G06F 9/54* (2013.01)

(58) Field of Classification Search
CPC ................................ G06F 9/54; G06F 3/0644
USPC .......................................... 719/310; 711/173
See application file for complete search history.

(56) References Cited

U.S. PATENT DOCUMENTS

| 8,868,822 B2 * | 10/2014 | Komori | G06F 12/0246 |
| | | | 711/100 |
| 2008/0177974 A1 * | 7/2008 | Chiang | G06F 12/1036 |
| | | | 711/173 |
| 2015/0293752 A1 | 10/2015 | Varma | |

OTHER PUBLICATIONS

Emanuel H. Rubensson, Chunks and Tasks: A programming model for parallelization of dynamic algorithms. (Year: 2013).*

(Continued)

*Primary Examiner* — Lechi Truong
(74) *Attorney, Agent, or Firm* — K&L Gates LLP

(57) ABSTRACT

A method includes receiving, by a producer thread, an offer request associated with an item. Additionally, the method includes increasing, by the producer thread, a producer sequence. The producer thread determines (i) a chunk identifier, associated with the producer sequence, of a memory chunk from a doubly linked list of memory chunks and (ii) a slot position, from the producer sequence, in the memory chunk to offer the item. Additionally, the producer thread writes the item into the memory chunk at the slot position. A consumer thread determines the slot position of the item, consumes the item at the slot position, and determines the status of the slot position as an intermediate slot or the end slot. Responsive to determining the slot position as the end slot, the consumer thread detaches the memory chunk to remove the memory chunk from the doubly linked list of memory chunks.

16 Claims, 10 Drawing Sheets

(56) References Cited

OTHER PUBLICATIONS

Elad Gidron, Idit Keidar, Dmitri Perelman; "SALSA: Scalable and Low Synchronization NUMA-aware Algorithm for Producer-Consumer Pools"; Technion, Haifa, Israel; Accessed on or before Apr. 28, 2019; (27 Pages).

Adam Morrison; "Fast and Scalable Software Execution on Multicores"; Telaviv University, The Raymond and Beverly Sackler Faculty of Exact Sciences, The Blavatnik School of Computer Science; Published Dec. 2013; (190 Pages).

Hakan Sundell, Philippas Tsigas; "Lock-Free and Practical Deques and Doubly Linked Lists using Single-Word Compare-And-Swap"; Department of Computing Science Chalmers University of Technology and Goteborg University; Goteborg, Sweden; Accessed on or before Apr. 28, 2019; (40 Pages).

RSS "Presentation: Novel Algos and Optimizations in JCTools Concurrent Queues"; Mobile Monitoring Solutions; Published Apr. 18, 2019; (16 Pages).

\* cited by examiner

SCALABLE MULTI-PRODUCER AND SINGLE-CONSUMER PROGRESSIVE CHUNKED QUEUE

BACKGROUND

Computer systems may routinely perform tasks and process work such as offer requests. For example, processors may execute instructions to read, write, and copy memory entries, according to offer requests. Tasks may typically be added to a queue and completed on a first-in-first-out ("FIFO") basis or a last-in-first-out ("LIFO") basis.

The processors may use threads to complete tasks and process work such as offer requests. Physical resources, such as a hardware thread, may be associated with a processing core. For example, there may be a single hardware thread per core on a processor. Software threads (e.g., threads created by an application or a program) may also be scheduled to perform tasks. A software thread, which may be referred to as a thread of execution (or simply a thread) is a software unit. In a multi-processor/multi-core system, multiple threads can be executed in parallel. That is, each of the processors or cores may execute a thread simultaneously. One thread can pass a request to another thread to cause the request to be executed.

SUMMARY

The present disclosure provides new and innovative systems and methods of producing and consuming offer requests in a progress chunked queue. In an example, a system includes a memory configured to store a plurality of memory chunks and a processor that is configured to execute a plurality of producer threads. A producer thread of the plurality of producer threads is configured to receive an offer request associated with an item, and responsive to receiving the offer request, increase a producer sequence. The producer thread is also configured to determine (i) a chunk identifier (e.g., chunk ID) associated with the producer sequence, of an identified memory chunk (e.g., expected memory chunk) from the plurality of memory chunks and (ii) a position, from the producer sequence, in the identified memory chunk (e.g., expected memory chunk) to offer the item. Additionally, the producer thread is also configured to determine a first status of the chunk identifier (e.g., chunk ID of the current chunk) as one of valid or invalid. The chunk identifier is valid if the chunk identifier (e.g., chunk ID) matches an identifier of a current memory chunk of the plurality of memory chunks (e.g., the expected memory chunk identifier). Responsive to determining the first status of the chunk identifier (e.g., chunk ID) as valid, the producer thread is configured to write the item into the identified memory chunk (e.g., expected memory chunk) at the position. Responsive to determining the first status of the chunk identifier (e.g., chunk ID) as invalid, the producer thread is configured to read the current memory chunk and determine a second status of the current identifier as greater or equal than the chunk identifier (e.g., expected chunk identifier) or less than the chunk identifier (e.g., expected chunk identifier). Responsive to determining the second status of the current identifier as greater or equal than the chunk identifier (e.g., expected chunk identifier), the producer thread is configured to walk backward from the current memory chunk to the identified memory chunk (e.g., expected memory chunk). Responsive to determining the second status of the current identifier as less than the chunk identifier, the producer thread is configured to append a new memory chunk to the current memory chunk. (e.g., the producer thread is configured to continue to try appending new memory chunks until the current chunk identifier is greater than or equal to the expected chunk identifier).

In an example, a method includes receiving, by a producer thread, an offer request associated with an item. Responsive to receiving the offer request, the producer thread increases a producer sequence. The producer thread determines (i) a chunk identifier (e.g., chunk ID) of an identified memory chunk (e.g., expected memory chunk) from the producer sequence and (ii) a position in the identified memory chunk (e.g., expected memory chunk) to offer the item from the producer sequence. Additionally, the producer thread determines a first status of the chunk identifier (e.g., chunk ID) as one of valid or invalid. The chunk identifier (e.g., chunk ID) is valid if the chunk identifier matches an identifier of a current memory chunk (e.g., the expected memory chunk identifier). Responsive to determining the first status of the chunk identifier (e.g., chunk ID) as valid, the producer thread writes the item into the identified memory chunk (e.g., expected memory chunk) at the position. Responsive to determining the first status of the chunk identifier (e.g., chunk ID) as invalid, the producer thread reads the current memory chunk and determine a second status of the current identifier as greater than or equal to the chunk identifier or less than the chunk identifier. Responsive to determining the second status of the current identifier as greater than or equal to the chunk identifier, the producer thread walks backward from the current memory chunk to the identified memory chunk (e.g., expected memory chunk). Responsive to determining the second status of the current identifier as less than the chunk identifier, the producer thread appends a new memory chunk to the current memory chunk.

In an example, a method includes receiving, by a producer thread, an offer request associated with an item. Responsive to receiving the offer request, the method includes increasing, by the producer thread, a producer sequence. The method also includes determining, by the producer thread, (i) a chunk identifier (e.g., chunk ID), associated with the producer sequence, of a memory chunk and (ii) a slot position, from the producer sequence, in the memory chunk to offer the item. Additionally, the method includes writing, by the producer thread, the item into the memory chunk at the slot position. The method also includes determining, by a consumer thread, the slot position of the item, consuming, by the consumer thread, the item at the slot position, and determining, by the consumer thread, the status of the slot position as an intermediate slot or the end slot. Responsive to determining the slot position as the end slot, the method includes detaching the memory chunk to remove the memory chunk from a doubly linked list of memory chunks (e.g., the double linked list of memory chunks compose the unbounded queue).

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
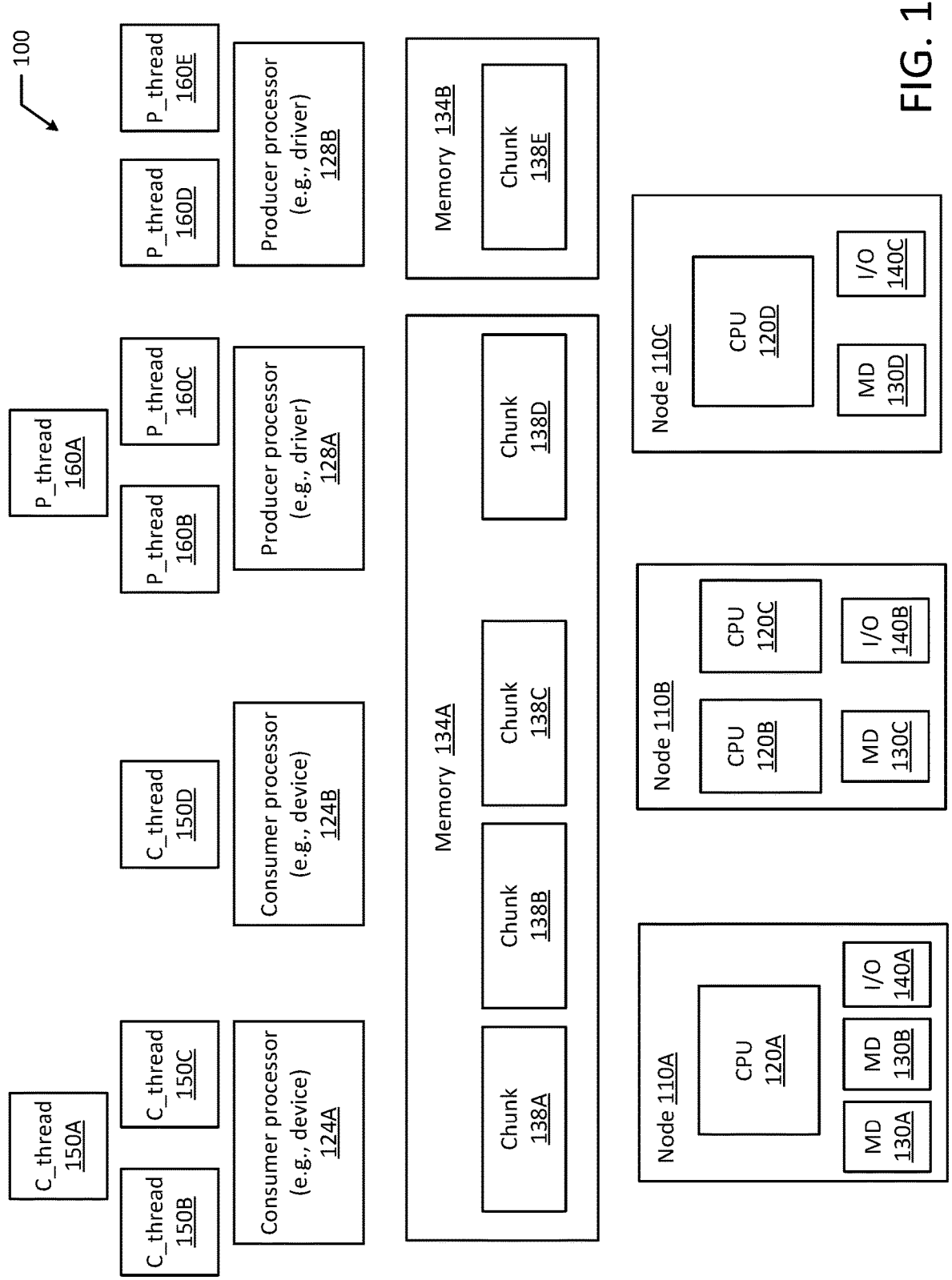
FIG. 1 illustrates block diagrams of example computing systems according to example embodiments of the present disclosure.

Techniques are disclosed for producing and consuming offer requests in a progressive chunked queue that is highly-scalable for a multi-producer and single consumer configuration. For example, the disclosed systems and methods may be used to produce and consume offer requests resulting from an application or software, such as middleware that lays between an operating system (OS) and an application(s) running on the OS. An example middleware is JBoss® Enterprise Application Platform ("EAP"). Computer services (e.g., Java middleware services, Red Hat® JBoss® EAP) depend heavily on performing work (e.g., producing offer requests) from a plurality of producer threads. Additionally, a multi-tenant environment such as OpenShift (e.g., the OpenShift Container Platform) may need to interface with and submit requests from multiple worker threads to a single core thread that will execute them. The disclosed systems and methods may be used in scenarios with requests from several worker threads or producers that are executed by a single thread.

Typically, multi-producer concurrent queues are based on compare- and swap instructions, which do not scale (i.e., negatively scale) with the quantity of offering threads. For example, on the offering or producer side, concurrent unbounded queue implementations often rely on compare-and-swap ("CAS") instructions to move a producer sequence forward. Typically, the concurrent unbounded queue implementation uses a producer sequence value and an indicator on the slot where the produced item will be stored to notify a consumer(s) that something new has been added to the queue. This mechanism prevents the consumer from invaliding the producer by polling it continuously and ensures that the producer sequence is contented by other producers, which distributes the cache-misses over the produced slots in a more cache-friendly manner. If the consumer was allowed to continuously poll the producer sequence, every time the consumer checked or polled the producer sequence, the consumer may invalidate the cache-line and slow down the producer.

The concurrent unbounded queue implementations rely on CAS instructions because the instructions allows additional control (similar to that of a spin-lock) of exclusively writing the indicator per offering or producing thread while also allowing a producer to allocate new memory chunks to the queue when the queue is full. After allocating a new memory chunk, the other producers may continue to progress after the new memory chunk is allocated. A compare-and-swap ("CAS") instruction is an atomic instruction in multithreading to achieve synchronization. The CAS instruction compares the contents of a memory location with a given value and, only if they are the same, modifies the contents of that memory location to a new given value. The CAS instruction is performed as a single atomic operation, which guarantees that the new value is calculated based on up-to-date information. For example, if the value had been updated by another thread in the meantime, write the value would fail. However, multi-producer concurrent queues based on CAS instructions do not scale along with added producers and work may be wasted due to CAS failures that may cause poor system performance.

Specifically, a CAS instruction scales negatively with the quantity of threads, which prevents performance improvements for queues that have multiple threads instead of a single thread. For example, most CAS-based queues use a back-off strategy on each failed offer due to contention, which artificially increases throughput by reducing the contention, but ultimately makes latencies much worse (e.g., to avoid contention, each producer waits before performing the offer and making any progress).

To provide a highly-scalable system and prevent wasted work due to CAS failures, a progressively chunked queue may instead rely on fetch-and-add instructions, which allows the queue to scale with the quantity of producers. A fetch-and-add ("FAA") instruction atomically increments the contents of a memory location by a specified value. For example, the FAA instruction performs an operation to increment a value at an address (e.g., address_X) by an amount (e.g., amount_A) in such a way that if the operation is executed by a process in a concurrent system, no other process will see an intermediate result. The FAA instruction advantageously allows a processor to atomically increment a value in memory while preventing multiple processor collisions. Chunked queues may use a linked list of fixed size arrays or chunks and as a consumer catches up with the producer, the empty or redundant chunks may be discarded such that the overall footprint of the chunked queue decreases. However, the progressive chunked queue may reuse empty or redundant chunks that have been consumed and may also allocate and add new chunks to the queue.

The progressive chunked queue is based on an assumption that each producer can be "left behind" spatially, which reduces the coordination efforts among them to guarantee individual progress. Unlike the CAS-based queues, the progressive chunked queue is not "just" lock-free, but instead is "mostly" wait free because it depends on whether a new memory chunk allocation takes place while offering. If a new memory chunk is needed, the offer side is lock-free although "progressive" given that any producer can make progress and add a new memory chunk instead of relying on a single producer to make progress before other producers can progress. Specifically, any of the producers may make progress and add a new memory chunk based on their ability and speed of performing their current work items. Using the assumptions above, the systems and methods disclosed herein advantageously allow for the creating of computation pipelines with much higher overall throughput and lower latencies for producer tasks. For example, initial tests indicate that on an 8-core machine with 7 producers (e.g., each producer on a different core) the system is capable of performing 5 times more operations (e.g., 40 operations per microsecond vs. 8 operations per microsecond).

FIG. 1 depicts a high-level component diagram of an example computing system 100 in accordance with one or more aspects of the present disclosure. The computing system 100 may include a memory (e.g., memory 134A-B) with a plurality of memory chunks (e.g., chunks 138A-E) and one or more processors (e.g., consumer processor(s) 124A-B and producer processor(s) 128A-B). Each processor may include one or more cores that execute various threads. For example, consumer threads (e.g., C_threads 150A-D) and producer threads (e.g., P_threads 160A-E) may execute instructions much like a software thread. In an example, the threads may be software thread, which may be created by programs or applications (e.g., applications within a virtual machine). In another example, the threads may be hardware threads. The processors (e.g., consumer processor(s) 124A-B and producer processor(s) 128A-B) may execute tasks or process offer requests using the consumer threads (e.g., C_threads 150A-D) and producer threads (e.g., P_threads 160A-E).

The threads (e.g., C_threads 150A-D and P_threads 160A-E) may be ordered sequences of instructions that allow the processors (e.g., consumer processor(s) 124A-B and producer processor(s) 128A-B) to execute multiple instruction streams simultaneously. For example, producer processor 128A may simultaneously run three instruction streams on P_threads 160A-C.

The processors (e.g., consumer processor(s) 124A-B and producer processor(s) 128A-B) may be physical processors or may be virtual processors. Virtual processors may be run within virtual machines, which may include a guest OS, guest memory, virtual memory devices ("VIVID"), and virtual input/output devices ("VI/O").

Figure 2:
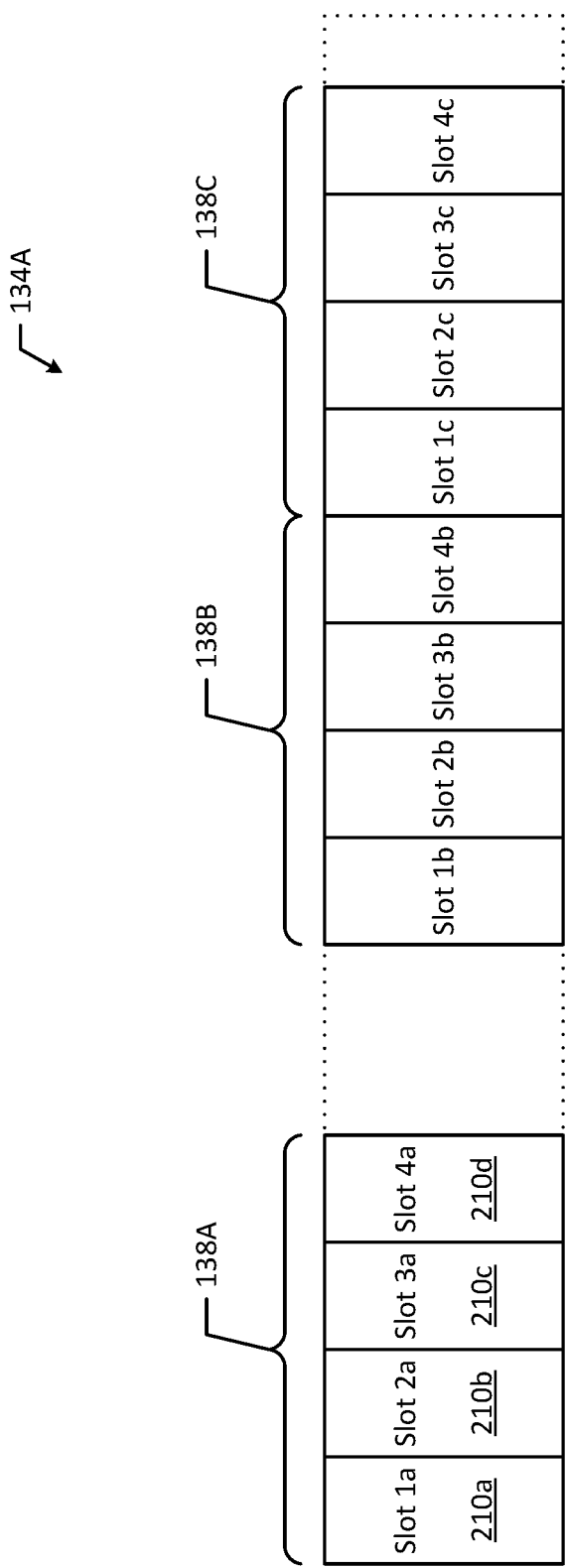
FIG. 2 illustrates a block diagram of an example pool or doubly linked list of memory chunks according to an example embodiment of the present disclosure.

The computer system 100A may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Consumer processor(s) 124A-B and producer processor(s) 128A-B may be cores of CPU(s) 120A-D. Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Additionally, if the consumer processor(s) 124A-B and producer processor(s) are virtual processors (e.g., virtual CPUs), they may be provisioned on the same host or node (e.g., node 110A) or different nodes. For example, a consumer processor (e.g., consumer processor 124A) may be associated with its own respective physical processor (e.g., physical CPUs 120A of node 110A). In another example, virtual processors may be assigned to the same physical processor or CPU. Additionally, virtual processors may be assigned to different cores on the same physical processor. FIG. 2 depicts a high-level component diagram of an example portion of memory 134A, which includes memory chunks 138A-C. Each memory chunk may include a plurality of slots. For example, memory chunk 138A may include slots 210a-d (e.g., "Slot 1a", "Slot 2a", "Slot 3a", and "Slot 4a"). Each slot may be 4 bytes, 8 bytes, etc. Additionally, a memory chunk may occupy multiple cache-lines such as two cache-lines.

The memory chunks may be connected to form a continuous region of memory (e.g., memory chunks 138B and 138C). Additionally, a memory chunks may be disconnected or divided from other memory chunks in other regions of the memory 134A. For example, memory chunk 138A is disconnected from memory chunk 138B. As illustrated in FIG. 2, the plurality of slots (e.g., slots 210a-d) may be arranged in an array. Each memory chunk has a chunk size, which may be a fixed value. In the illustrated example, each memory chunk 138A-C has four slots, but memory chunks 138 may include additional slots (e.g., 6 slots, 10 slots, 32 slots, etc.). An entire memory chunk 138 may have a chunk size of 1024 bytes. In an example, a NULL value may be stored in a slot to indicate that the slot is empty or that the slot is being consumed.

As illustrated in FIG. 2, multiple memory chunks (e.g., chunk 138A-C) may create a memory pool. The memory chunks (e.g., chunk 138A-C) may be on a single memory device (e.g., MD 130A). Alternatively, the memory chunks (e.g., chunks 138A-C) may be distributed over several memory devices (e.g., MD 130A-B). A memory chunk may be referred to as an atomic chunk, which may be identified by an array of item slots with a capacity, an identifier (e.g., Chunk ID) and that points to other memory chunks. For example, the array may be defined as "AtomicChunk (chunk_id, chunk_capacity, prev: Atomic Chunk, next: AtomicChunk)." Operations that may be performed on a memory chunk (e.g., chunk 138A-C) include changing to the previous memory chunk or next memory chunk, loading a value into an index position of the array of slots belonging to the memory chunk (e.g., load(index)), and storing a value into the index position of the array of slots belonging to the memory chunk (e.g., store(index, p)).

As described in more detail below, the producer processor(s) 128A-B or associated processor threads (e.g., P_threads 160A-E) may receive offer requests to produce items such as packet addresses. A producer sequence may represent the offer identity of an offer request. Specifically, the producer sequence may represent the identity of the offer and an identifier, such as a "Chunk_ID" may represent the identity of the memory chunk associated with a specific producer sequence. For example, the producer sequence may be implemented on a 64 bit counter. A buffer may point to the current memory chunk or atomic chunk. For example, a producer buffer (e.g., "ProducerBuffer") may be a pointer to the current memory chunk where the producer offers items. Additionally, a counter (e.g., "ProducerChunkId") may represent an identifier of the current producer buffer. Counter operations include loading (e.g., returning the value of the counter), storing a new value for the counter (e.g., store(new_vlaue)), comparing and swapping (atomically) the value of the counter from an identified or expected value to the new value (e.g., C&S(expected, new_value)). The CAS instruction may fail if the starting value was not the identified or expected value. Additionally, the CAS instruction may fail if another producer thread (e.g., P_threads 160A-E) has successfully changed the value before the current CAS instruction completes. Additional counter operations include FAA instructions that obtain and increment (atomically) the value of the counter by a delta (e.g., F&A(delta)).

Similarly, the consumer side may have a consumer buffer (e.g., "ConsumerBuffer") and a consumer sequence ("ConsumerSequence"). The consumer buffer may be a pointer to the current memory chunk where the consumer processor(s) 124A-B or consumer threads (e.g., C_thread 150A-D) can poll the next item if the item is present. The consumer sequence may also be implemented on a 64 bit counter that represents an identifier of a consume request. A single producer and single consumer bounded queue that can hold a maximum of "N" free memory chunks may be defined as "FreeChunks (N):".

In an example configuration, each of the memory chunks may have the same chunk capacity (e.g., chunk_capacity) and the "ProducerChunkID" may be initialized at a value of "0" and the "ProducerBuffer" may be set as (ProducerBuffer=AtomicChunk (chunk_id=0, chunk_capacity, prev=NULL, next=NULL) on initialization. Additionally, the "ConsumerBuffer" may be set as the "ProducerBuffer" on initialization and (FreeChunk(N)= {AtomicChunk(chunk_id=-1, chunk_capacity, prev=NULL, next=NULL, . . . }.

Example operations include:

```
offer(element)
    current_producer_seq=ProducerSequence.f&a(1);
    producer_buffer_index=current_producer_seq % chunk_
        capacity; //modulus operation
    producer_buffer_chunk_id=current_producer_seq/
        chunk_capacity; //division operation
    current_producer_buffer=ProducerBuffer;
    if (current_producer_buffer.chunk_id !=producer_buffer_
        chunk_id)
        {current_producer_buffer=producer_buffer_of(cur-
        rent_producer_buffer, producer_buffer_chunk_id);
        }
    current_producer_buffer.store(producer_buffer_index,
        element);
}
where:
//walk or allocate chunks, if needed, until it get to the
    expected chunk id
producer_buffer_of(buffer, expected_chunk_id): AtomicC-
hunk {
jumps_backward=0;
while (true) {
    if (buffer==NULL) {
    buffer=ProducerBuffer;
    }
    chunk_id=buffer.chunk_id;
    if (chunk_id==-1) {
    //a consumer has already recycled buffer
    buffer=NULL;
    continue;
    }
    //how many chunks is necessary to walk backward from
the current buffer to get to the expected one?
    jumps_backward=chunk_id-expected_chunk_id;
    if (jumps_backward>=0) {
    break;
    }
    //buffer cannot walk to the expected chunk id by moving
forward, because AtomicChunk.next is not stable;
    //the consumer could consume it during the chase
    //This producer thread try to allocate ANY missing chunk
in order to walk backward (or just stay still)
    if (chunk_id==ProducerChunkId) {
    //try to append the next missing one
    buffer=append_next_chunk(buffer, chunk_id);
    }
}
for (i=0; i<jump_backward; i++) {
    //moving backward is fine: the consumer cannot proceed
over expected chunk id
    //until the producer will occupy the buffer slot
    buffer=buffer.prev;
    }
    return buffer;
}

//try to append a new chunk or fail if others has succeeded
append_next_chunk(buffer, chunk_id): AtomicChunk {
    next_chunk_id=chunk_id+1;
    if (!ProducerChunkIndex.c&s(chunk_id, next_chunk_id)
        {
        return NULL;
        }
    new_chunk=FreeChunks.poll( )
    if (new_chunk !=NULL) {
        //new_chunk. chunk_id is -1
        ProducerBuffer=new_chunk;
        new_chunk.prev=buffer;
        //It makes:
        //-incoming producers able to succeed if they need to
            offer on next_chunk_id
        //-stalled producers to jump backward, if needed
        //-appending producers to attempt to append a new
            chunk
        new_chunk.chunk_id=next_chunk_id;
    else {
        new_chunk=AtomicChunk(chunk_id=next_chunk,
            chunk_capacity, prev=buffer, next=NULL);
        //It makes:
        //-incoming producers able to succeed if they need to
            offer on next_chunk_id
        //-stalled producers to jump backward, if needed
        //-appending producers to attempt to append a new
            chunk
        ProducerBuffer=new_chunk;
    }
    //it enables a consumer to finish consuming buffer (and
        maybe recycle it)
    buffer.next=new_chunk;
}
```

Figure 3A:
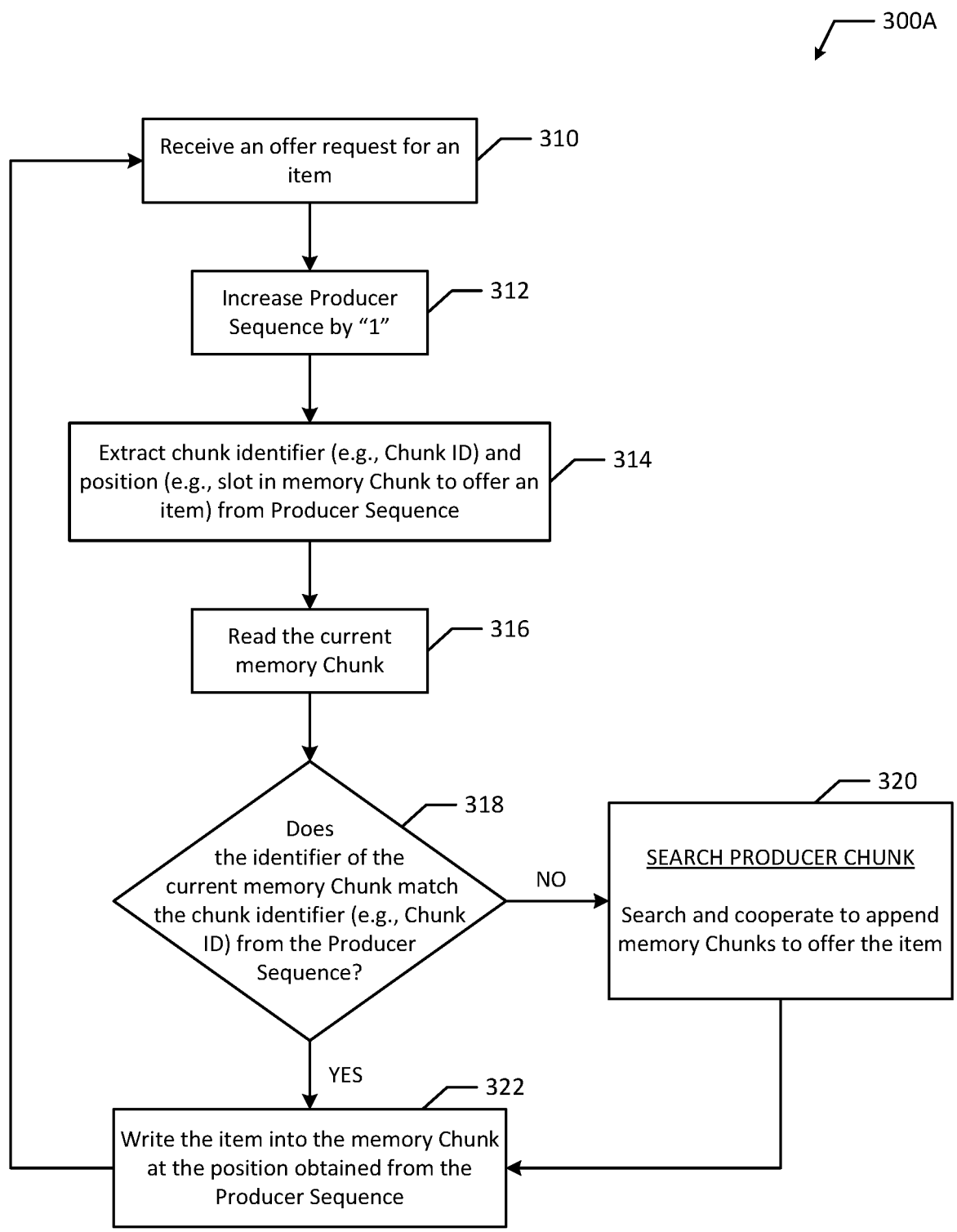
FIGS. 3A, 3B and 3C illustrate a flowchart of an example process for processing an offer request in a progressive chunked queue according to an example embodiment of the present disclosure.
Figure 3B:
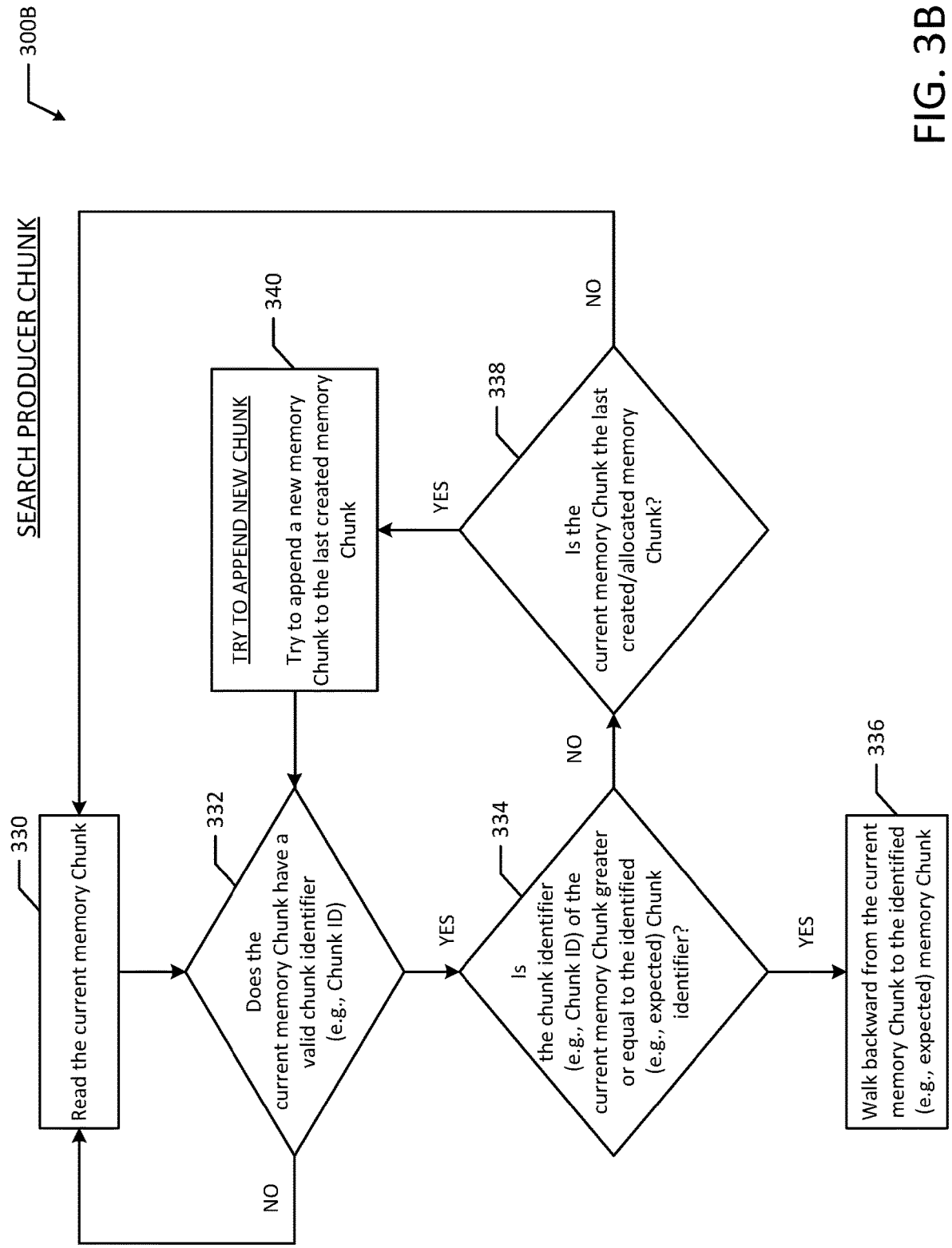
Figure 3C:
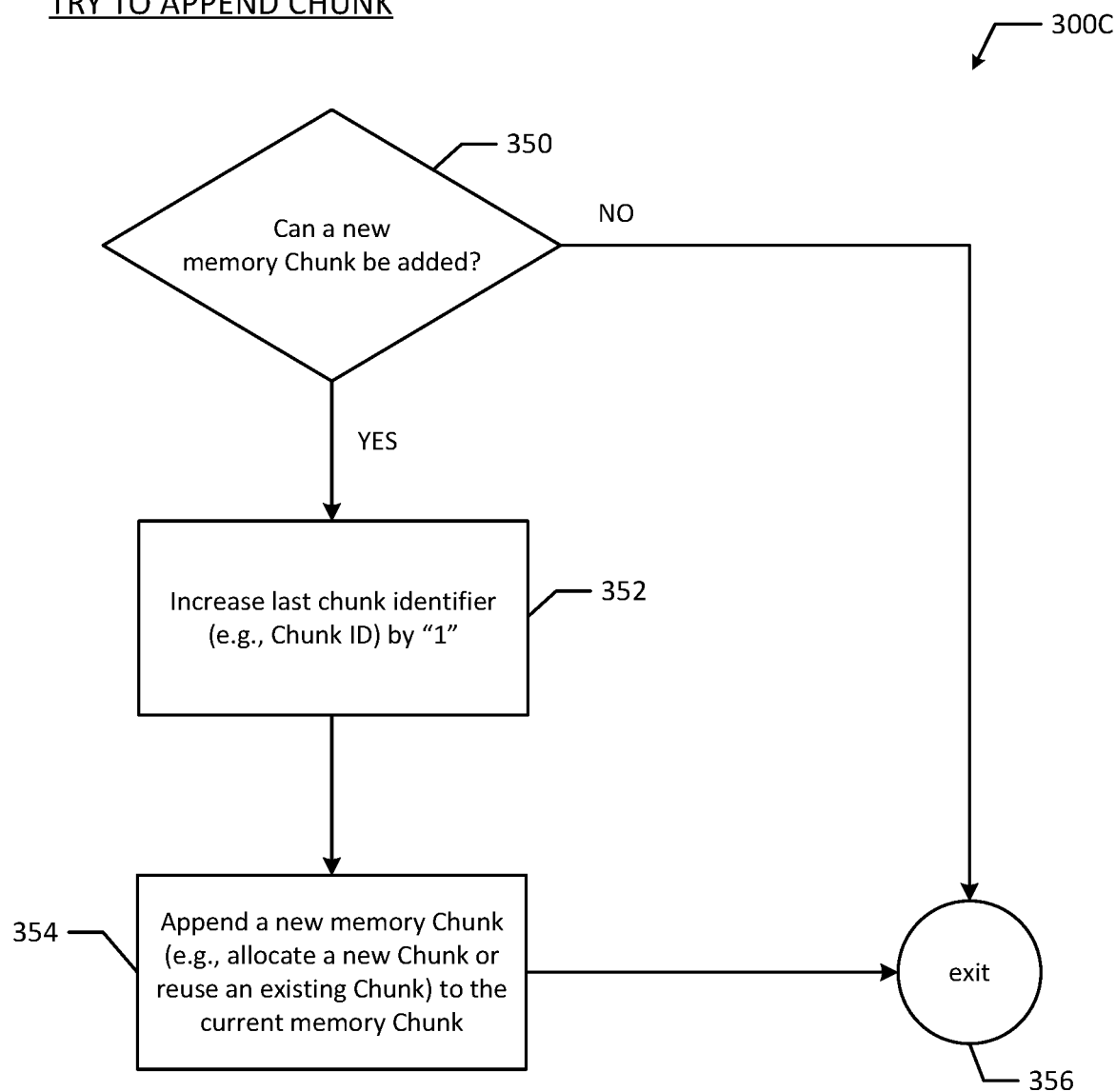

FIGS. 3A, 3B and 3C illustrate a flowchart for processing an offer request in a progressive chunked queue. As illustrated in FIG. 3A, a producer thread (e.g., producer thread 160A of producer processor 128A), hereinafter referred to generally as producer thread 160, may receive an offer request for an item (block 310). For example, the offer request may be associated with an item such as a packet address. Responsive to receiving the offer request, the producer thread 160 may increase a producer sequence by "1" (block 312). For example, the producer sequence may be a counter that identifies an offer request. The producer sequence or counters may be incremented and decremented by the producer processor(s) 128A-B or producer threads (e.g., P_threads 160A-E). Additionally, the producer sequence may be an integer, such as a 64 bit integer or counter that represents the identifier of an offer request. If the chunk size of a memory chunk (e.g., chunk 138A) is a fixed value, the chunk identifier (e.g., chunk ID) may be obtained by dividing the producer sequence by the chunk size (e.g., Chunk_ID=producer sequence/chunk size). Similarly, the offset or position in the memory chunk may be determined by the modulo operation (e.g., modulus) between the producer sequence and the chunk size.

The producer thread 160 may increase the producer sequence by a value, such as an integer value (e.g., an integer value of "1" as illustrated in FIG. 3A). Then, the producer thread 160 may extract a chunk identifier (e.g., a Chunk ID) and a position (e.g., the slot in a memory chunk 138 to offer the item) from the producer sequence (block 314).

Then, the producer thread 160 may read the current memory chunk (block 316) to determine whether the identifier of the current memory chunk matches the chunk identifier (e.g., Chunk ID) obtained from the producer sequence (block 318). If the identifier of the current memory chunk does not match the chunk identifier (e.g., Chunk ID) obtained form the producer sequence, the producer thread 160 may search and cooperate to append a memory chunk to offer the item (block 320), which is described in more detail in FIG. 3B. The appending memory chunk may be a new memory chunk (e.g., chunk 138D) or may be a memory chunk that was previously allocated to the pool of memory chunks (e.g., chunk 138C) or doubly linked list of memory chunks. If the identifier of the current memory chunk matches the chunk identifier (e.g., Chunk ID) obtained from the producer sequence, then the producer thread 160 may write the item into the memory chunk at the position obtained from the producer sequence (block 322). For example, the producer thread 160 may write the packet address at the identified slot position in the memory chunk. After producing or writing the packet address, the producer thread 160 may wait for another request.

FIG. 3B illustrates a flowchart of method 300B, which illustrates searching and appending a memory chunk according to block 320 of FIG. 3A. For example, when searching for a memory chunk, the producer thread 160 may read the current memory chunk (block 330). Then, the producer thread may determine whether the current memory chunk has a valid identifier (e.g., Chunk ID) (block 332). If the if the current memory chunk does not have a valid identifier (e.g., Chunk ID), then the producer thread may attempt to read the current memory chunk again. If the memory chunk does have a valid identifier, the producer thread 160 may determine if the identifier (e.g., Chunk ID) of the current memory chunk is greater or equal to the identifier of the identified memory chunk (block 334). If the identifiers are equal, then the current memory chunk is the same memory chunk identified by the offer request.

Specifically, the producer thread 160 may determine if the identifier of the current memory chunk is greater than or equal to the identifier of the memory chunk identified in the offer request. If the identifier of the current memory chunk is greater than the identified memory chunk identifier, then the producer thread 160 may walk backwards from the current memory chunk to the identified memory chunk (block 336). For example, the producer thread 160 may walk back from a memory chunk with a "Chunk ID=2" to a memory chunk with a "Chunk ID=1." After walking backward from the current memory chunk to the identified (e.g., expected) memory chunk, the producer thread may then write the item into the memory chunk at the position identified by the producer sequence as illustrated at block 322 of FIG. 3A. If the identifier of the current memory chunk is equal to the identified memory chunk identifier, the producer thread 160 may stay stationary (e.g., walk backwards zero jumps or spots).

If the identifier (e.g., Chunk ID) of the current memory chunk is not greater than or equal to the identified chunk identifier, then the producer thread 160 may determine whether the current memory chunk is the last created or allocated memory chunk (block 338). For example, the producer thread 160 may determine if the current memory chunk was created or allocated most recently for the memory chunk pool. If the current memory chunk was not the last created or allocated, then the producer thread 160 may attempt to read the current memory chunk again (block 330). In some instances, the current memory chunk may have changed.

If the current memory chunk was the last created or allocated memory chunk, then the producer thread 160 may try to append a new memory chunk to the last created memory chunk (e.g., the current memory chunk) (block 340), which is described in more detail in FIG. 3C. For illustrative purposes, if memory chunk 138B was the last created memory chunk, a new memory chunk (e.g., chunk 138C) may be appended as represented in the figure. After appending the new memory chunk, the method continues on to block 332 to determine if the newly appended memory chunk has a valid identifier (e.g., Chunk ID).

FIG. 3C illustrates a flowchart of method 300C, which illustrates try to append a new memory chunk according to block 340 of FIG. 3B. For example, when trying to append a new memory chunk, the producer thread 160 may determine if a new memory chunk can be added (block 350). If a new memory chunk can be added, the producer thread 160 may increase the last chunk identifier (e.g., chunk ID) by "1" (block 352). Then, the producer thread 160 may append a new memory chunk (e.g., allocated a new memory chunk or reuse an existing memory chunk) to the current memory chunk (block 354). Then the producer thread may exit (block 356) and return back to the flow diagram of method 300B as illustrated in FIG. 3B. If the producer thread 160 determines that a new memory chunk cannot be added, then the producer thread 160 may exit (block 356) and return back to the flow diagram of method 300B at block 332.

Figure 4:
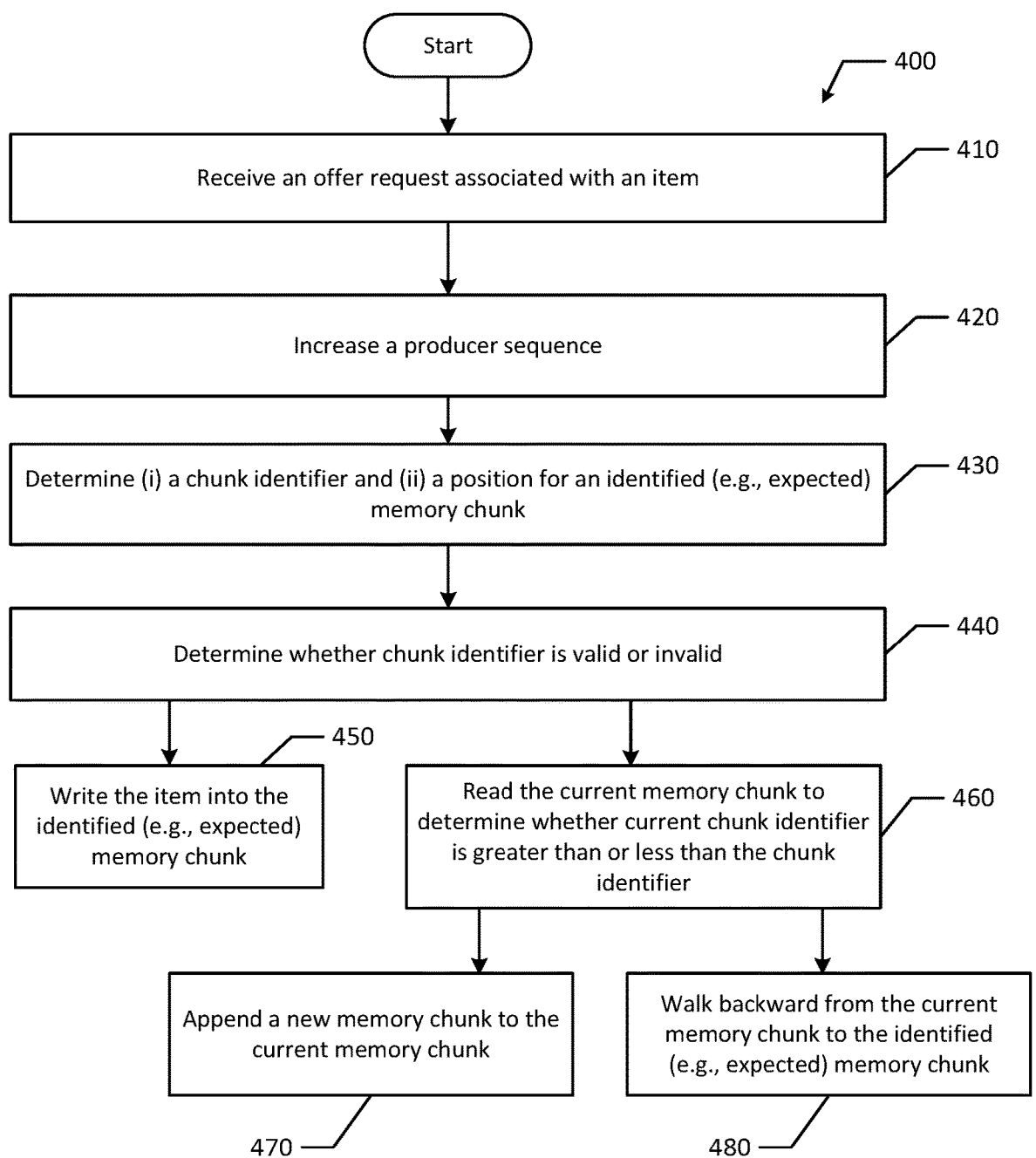
FIG. 4 illustrates a flowchart of an example process for processing an offer request in a progressive chunked queue according to an example embodiment of the present disclosure.

FIG. 4 illustrates a flowchart of an example method 400 for processing an offer request in a progressive chunked queue according to an example embodiment of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both.

The example method 400 includes receiving an offer request associated with an item (block 410). The offer request may be received from another processor, device or program (e.g., application). Then, the method 400 includes increasing a producer sequence (block 420). The producer sequence may in an integer, such as a 64-bit integer. Additionally, the producer sequence may be associated with a chunk identifier that identifies the memory chunk for the request and a position that identifies the slot for producing the item.

Next, the method 400 includes determining (i) a chunk identifier and (ii) a position for an identified (e.g., expected) memory chunk (block 430). For example, the producer thread 160 may extract the chunk identifier and position from the producer sequence. Then, the method 400 includes determining whether the chunk identifier is valid or invalid (block 440). A valid identifier may identify a memory chunk that is part of the memory chunk pool. For example, an identifier that identifies memory chunk 138E may be invalid for a memory chunk pool that includes memory chunks 138A-D. Based on the determination, the method includes either writing the item into the identified (e.g., expected) memory chunk (block 450) or reading the current memory chunk to determine whether the current chunk identifier is greater than or less than the chunk identifier (block 460). If the identifier is valid and the memory chunk matches the current memory chunk, then the producer thread 160 may write the item (e.g., packet address) at the position (e.g., slot position) determined at block 430.

If the item is not initially written into the identified memory chunk, after reading the current memory chunk, method 400 includes either appending a new memory chunk to the current memory chunk (block 470) or walking backward from the current memory chunk to the identified (e.g., expected) memory chunk (block 480). Appending a new memory chunk may be a newly allocated memory chunk. For illustrative purposes, memory chunk 138D may be allocated to an existing memory chunk pool or doubly linked list that includes memory chunks 138A-C such that the pool now includes memory chunks 138A-D. Alternatively, appending a new memory chunk may include reusing a pooled memory chunk. For example, each slot in memory chunk 138A may have been entirely consumed and is ready for reuse. In that instance, the memory chunk 138A may be rotated and reused. The pool or doubly linked list of memory chunks forms an unbounded queue due to the ability of the producer thread 160 to append new memory chunks to the current memory chunk that represent the tail of the doubly linked list.

The producer thread 160 may also walk between memory chunks, for example walk backwards from memory chunk 138C to memory chunk 138B. As discussed above, method 400 may include walking backward from the current memory chunk to the identified memory chunk at block 480.

Figure 5:
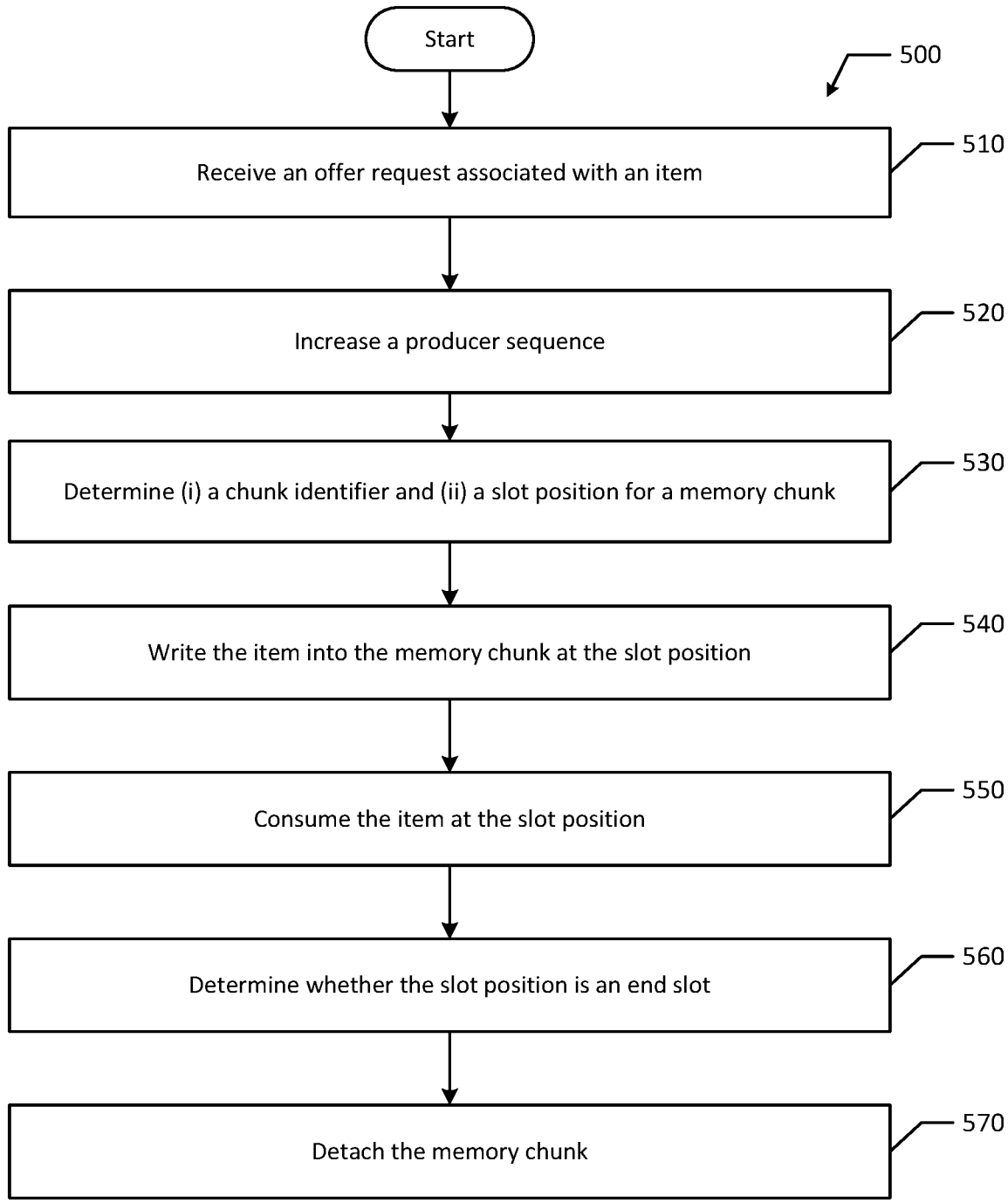
FIG. 5 illustrates a flowchart of an example process for processing an offer request in a progressive chunked queue according to an example embodiment of the present disclosure.

FIG. 5 illustrates a flowchart of an example method 500 for processing an offer request in a progressive chunked queue according to an example embodiment of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both.

The example method 500 includes receiving an offer request associated with an item (block 510), as similarly described above at block 410 in method 400. Then, the method 500 includes increasing a producer sequence (block 520), as similarly described above at block 420 in method 400. Next, the method 500 includes determining (i) a chunk identifier and (ii) a position for an identified (e.g., expected) memory chunk (block 530), as similarly described above at block 430 in method 400. Then, the method 500 includes writing the item into the memory chunk at the slot position (block 540), as similarly described at block 450 in method 400.

Method 500 also includes consuming the item at the slot position (block 550). For example, a consumer thread (e.g., C_thread 150D, hereinafter referred to generally as consumer thread 150) of a consumer processor 124B may determine that the item was produced at the slot position by using an item or message indicator. After determining that the item was newly produced, the consumer thread 150 may consume the item (e.g., read and copy the packet address). After consuming the item, the consumer thread 150 may overwrite the slot with a NULL value to indicate that the slot is empty. The consumer thread 150 may continue to consume items in a memory chunk until each of the items or messages in the memory chunk are consumed. The consumer thread 150 may also periodically poll a memory chunk to determine if the memory chunk is empty, which advantageously allows the consumer thread 150 to recognize when the memory chunk or pool of memory chunks (e.g., doubly linked list of memory chunks forming the unbounded queue) is empty. If the consumer thread 150 determines that the memory chunk or queue is empty, the systems and methods herein may employ parking strategies on the consumer processor(s) 124A-B or consumer threads 150A-D to save resources. For example, the consumer processor(s) 124A-B or consumer threads 150A-D may be parked such that the thread is blocked while waiting on something else to happen. Additionally, the consumer threads may be paused or may temporarily sleep to save resources while the queue is empty before being unparked.

Additionally, method 500 includes determining whether the slot position is an end slot (block 560). For example, if the slot is an end slot and each slot was consumed in order, then the consumer thread 150 may determine that the memory chunk has been fully consumed (e.g., each slot is now empty). Then, the method 500 includes detaching the memory chunk (block 570). For example, to provide similar cache-friendly advantages of CAS-based queues that re-use the same chunk of memory, the progressive chunked queue allows the consumer processor 124A-B or the consumer thread 150 to recycle an unused memory chunk. Specifically, when the consumer thread 150 arrives at the end of a memory chunk, the consumer thread 150 may detach the consumed memory chunk so that it can be recycled. For example, when a producer thread 160 requests a new memory chunk, the consumer thread 150 may recycle an empty memory chunk.

In an example with chunk size 4, where the producer sequence is at "5", the producer thread 160 may be unable to produce items by walking forward from the memory chunk associated with the producer sequence "1" or "0" because memory chunks prior to the memory chunk associated with producer sequence "5" are untrusted on the producer side. The producer thread 160 may not know how much progress the consumer thread 150 has made in the previous memory chunks and therefore cannot trust those memory chunks. However, the consumer thread 150 progresses based on newly produced items and consumes items in order. When the consumer thread 150 reaches the end of a memory chunk, the consumer thread 150 knows the memory chunk is empty and that it can be recycled for re-use. If the consumer thread 150 does not recycle the memory chunk, the producer threads 160 will treat the memory chunk as untrusted since it may still be full or partially full with unconsumed items.

Once the consumer thread 150 confirms the memory chunk is empty and recycles the memory chunk, the producer threads 160 may try to append it to the end of the current memory chunk, if not already done by other concurrent producers. In another example, the memory chunk may be recycled and others concurrent producers have already appended new memory chunks next to the one needed by the producer sequence "5": the producer thread 160 may walk or move backward into the recycled memory chunk.

Figure 6A:
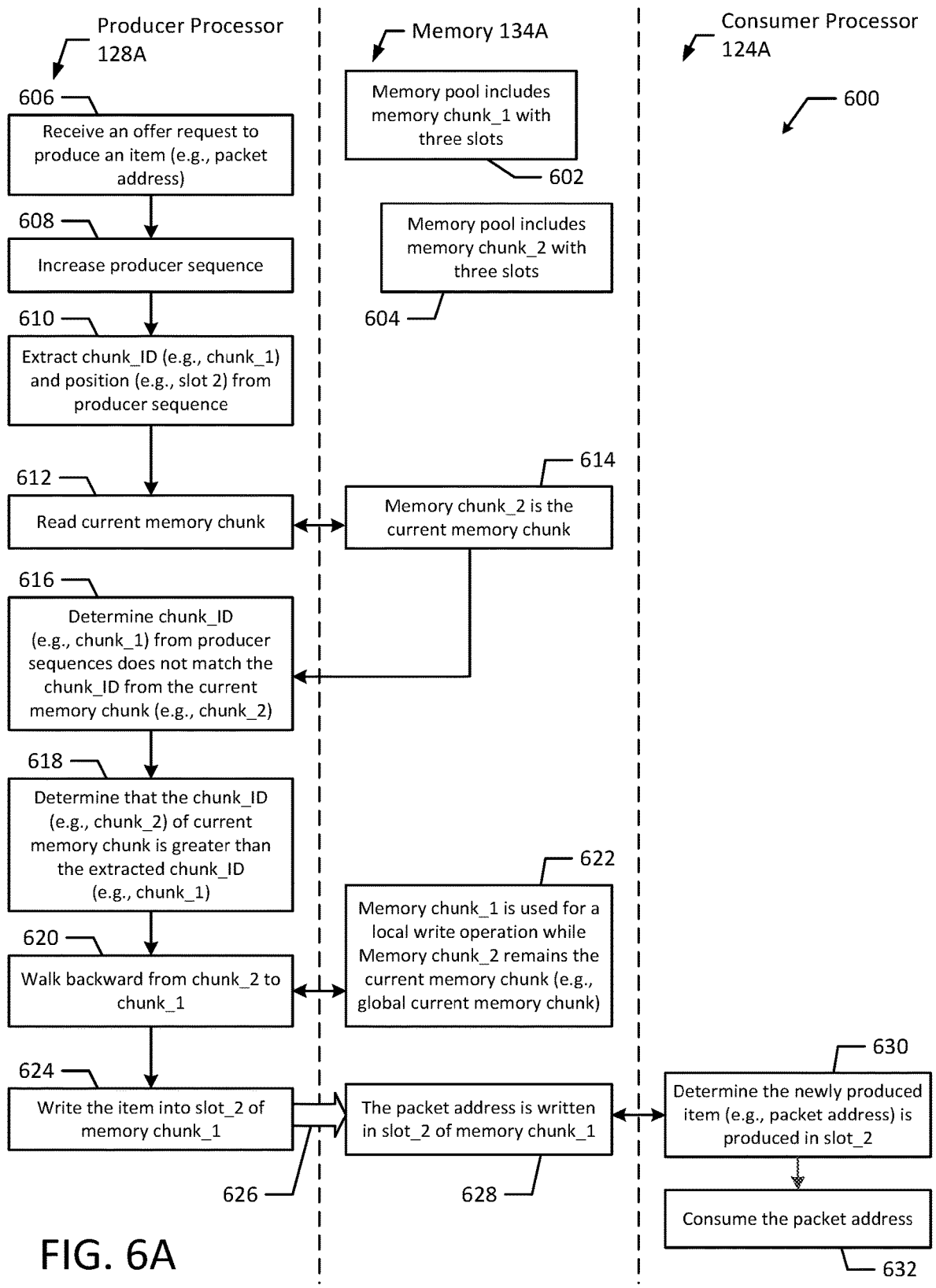
FIGS. 6A and 6B illustrate a flow diagram of an example process for processing and consuming offer requests in a progressive chunked queue according to an example embodiment of the present disclosure.
Figure 6B:
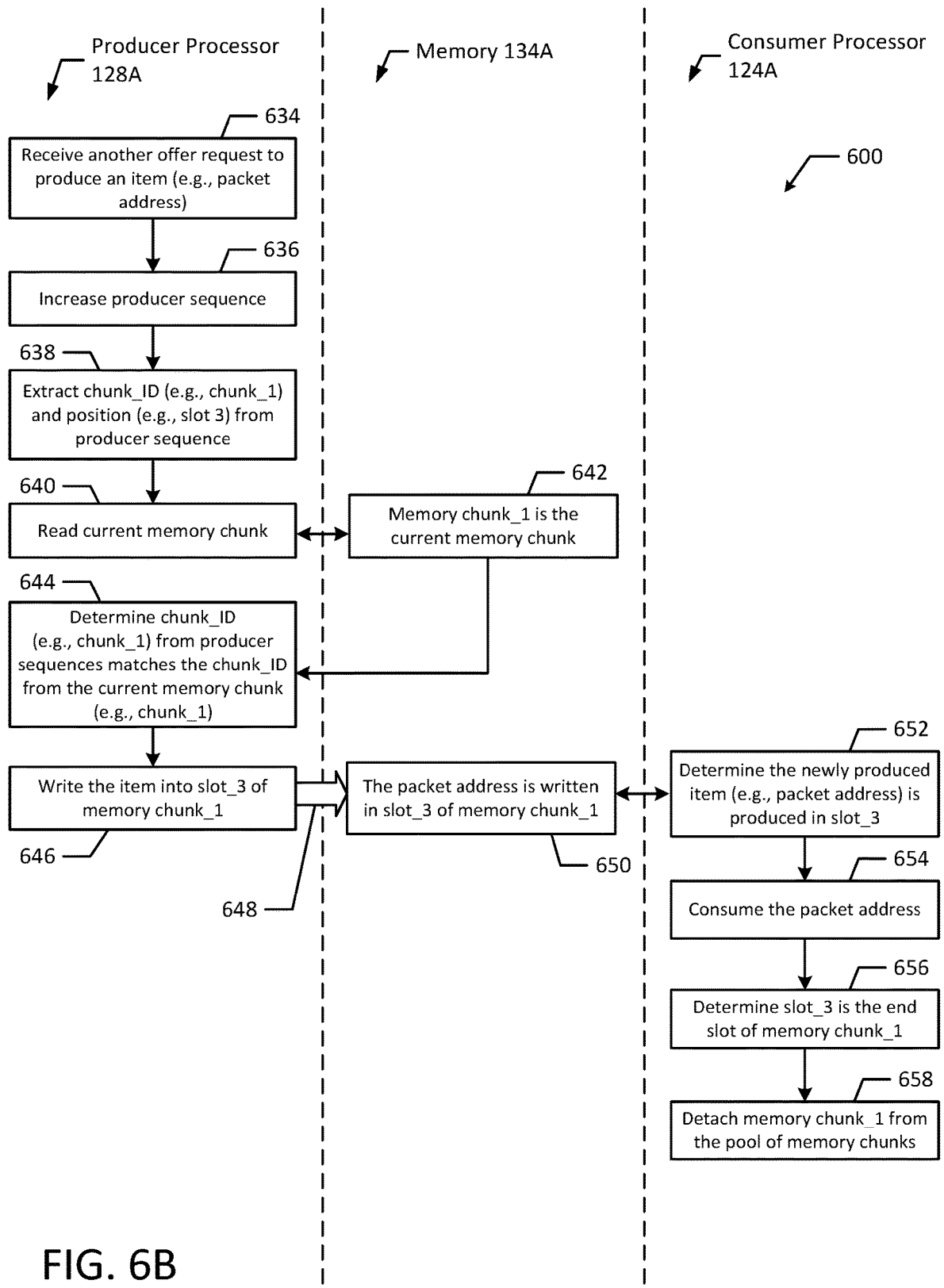

FIGS. 6A and 6B illustrate a flowchart of an example method 600 for processing and consuming offer requests in a progressive chunked queue in accordance with an example embodiment of the present disclosure. Although the example method 600 is described with reference to the flowchart illustrated in FIGS. 6A and 6B, it will be appreciated that many other methods of performing the acts associated with the method 600 may be used. For example, the order of some of the blocks may be changed, certain blocks may be combined with other blocks, and some of the blocks described are optional. For example, a producer processor 128A and a consumer processor 124A may communicate with memory 134A to perform example method 600.

In the illustrated example, the memory 134A or memory pool includes "memory chunk_1" (e.g., chunk 138A) with three slots (block 602) and "memory chunk_2" (e.g., chunk 138B) with three slots (block 604). Each slot may be 4 bytes, 8 bytes, etc. Additionally, a memory chunk may occupy multiple cache-lines such as two cache-lines. Typically, memory chunks that occupy more cache-lines result in less memory chunk rotations or CAS instructions. The producer processor 128A receives an offer request to produce an item (e.g., a packet address) (block 606). For example, a producer thread 160 of the producer processor 128A may receive an offer request to produce an item or message. After receiving the offer request, the producer processor 128A increases a producer sequence (block 608). The producer thread 160 may increase the producer sequence or producer counter.

Then, the producer processor 128A extracts a chunk ID (e.g., "chunk 1") and a position (e.g., "slot 2") from the producer sequence (block 610). The producer processor 128A also reads the current memory chunk (block 612). In the illustrated example, "memory chunk_2" (e.g., chunk 138B) is the current memory chunk (block 614).

Then, the producer processor 128A determines that the chunk ID (e.g., "chunk 1") form the producer sequence does not match the chunk ID from the current memory chunk (e.g., "chunk 2") (block 616). For example, the chunk ID from the producer sequence instead matches the chunk ID of "memory chunk_1", which is not the current memory chunk.

The producer processor 128A also determines that the chunk ID (e.g., "chunk 2") of the current memory chunk is greater than the extracted chunk ID (e.g., "chunk 1") (block 618). Because the chunk ID of the current memory chunk is greater than the extracted chunk ID, the producer processor 128A walks backward from "chunk 2" (e.g., chunk 138B) to "chunk 1" (e.g., chunk 138A) (block 620). Now, "memory chunk_1" is used for local write operations while "memory chunk_2" remains the current memory chunk (e.g., the global current memory chunk for other producers) (block 622). For example, after walking backward from "chunk 2" to "chunk 1", "chunk 1" may be used to write the item into it, but is not made the global current memory chunk for other producers.

Next, the producer processor 128A writes the item into "slot 2" of "memory chunk_1" (blocks 624 and 626). The item may be a packet address or a message and may be written into "slot 2" by the producer thread 160. The memory 124A or memory pool has the packet address associated with the offer request written into "slot 2" of "memory chunk_1" (block 628).

After the item is written into a slot, the consumer processor 124A determines that the newly produced item (e.g., packet address) is produced in "slot 2" (block 630). Then, the consumer processor 124A consumes the packet address (block 632). The consumer processor 124B or consumer thread 150 may determine that the item was produced at the slot position by using an item indicator. After determining that the item was newly produced, the consumer processor 124B or consumer thread 150 may consume the item (e.g., read and copy the packet address). After consuming the item, the consumer thread 150 may overwrite the slot with a NULL value to indicate that the slot is empty.

Continuing on FIG. 6B, the producer processor 128A may receive another offer request to produce an item (e.g., a packet address) (block 634). After receiving the offer request, the producer processor 128A increases a producer sequence (block 636), similar to block 608. Then, the producer processor 128A extracts a chunk ID (e.g., "chunk 1") and a position (e.g., "slot 3") from the producer sequence (block 638), similar to block 610. The producer processor also reads the current memory chunk (block 640). In the illustrated example, "memory chunk_1" (e.g., chunk 138B) is now the current memory chunk (block 642). For example, "memory chunk_1" may be the current memory chunk for the producer processor 128A while another memory is identified as the current global memory chunk for other producers.

Then, the producer processor 128A determines that the chunk ID (e.g., "chunk 1") form the producer sequence matches the chunk ID from the current memory chunk (e.g., "chunk 1") (block 644). After determining that the chunk ID from the current memory chunk (e.g., "chunk 1") matches the extracted chunk ID (e.g., "chunk 1") from the offer request, the producer processor 128A writes the item into "slot 3" of "memory chunk 1" (e.g., chunk 138A) (blocks 646 and 648), similar to blocks 624 and 626.

The memory 124A or memory pool has the packet address associated with the offer request written into "slot 3" of "memory chunk_1" (block 650). After the item is written into a slot, the consumer processor 124A determines that the newly produced item (e.g., packet address) is produced in "slot 3" (block 652), similar to block 630. Then, the consumer processor 124A consumes the packet address (block 654), similar to block 632.

Additionally, the consumer processor 124A determines that "slot 3" is the end slot of "memory chunk 1" (block 656). The consumer processor 124A or consumer thread 150 may continue to consume items in a memory chunk until it reaches the end slot, which indicates that each of the items in "memory chunk 1" are consumed. In an example, the consumer processor 124A or consumer thread 150 may periodically poll the memory chunk to determine if the memory chunk is empty, which advantageously allows the consumer thread 150 to recognize when the memory chunk or pool of memory chunks (e.g., pool or doubly linked list of memory chunks forming the unbounded queue) is empty.

Because "slot 3" is the end slot, the consumer processor 124A detaches "memory chunk 1" from the pool of memory chunks (block 658). Once "memory chunk 1" is detached, it may be recycled for re-use so that the producer processor 128 can produce future items to the memory chunk. For example, the detached memory chunk may be appended to the end of the current memory chunk by the producer processor 128A if the producer processor 128A reaches the end of the queue.

Figure 7:
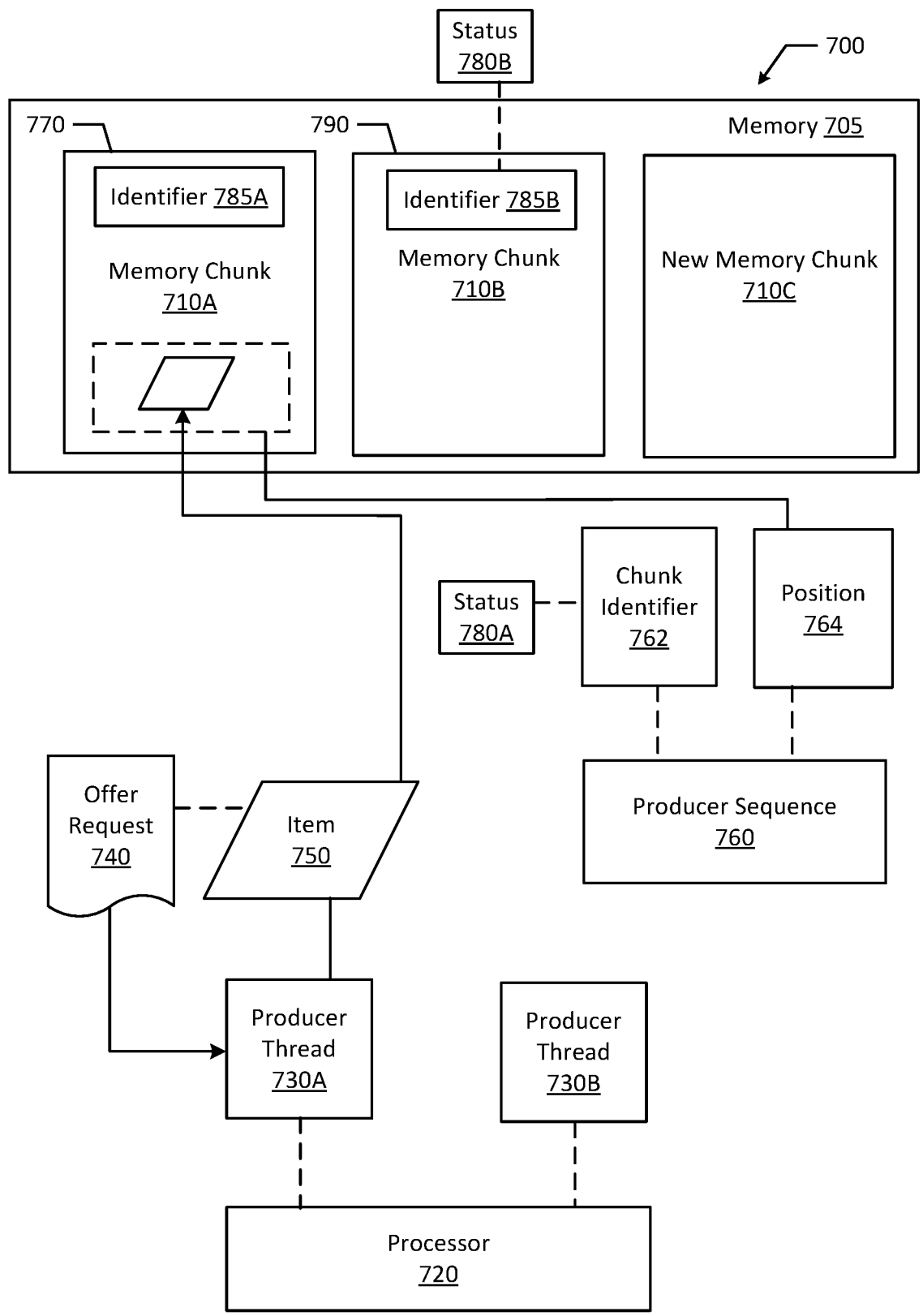
FIG. 7 illustrates a block diagram of an example progressive chunked queue system for processing offer requests according to an example embodiment of the present disclosure.

FIG. 7 is a block diagram of an example progressive chunked queue system 700 for processing offer requests according to an example embodiment of the present disclosure. The progressive chunked queue system 700 includes a memory 705 configured to store a plurality of memory chunks 710A-B and a processor 720 that is configured to execute a plurality of producer threads 730A-B. A producer thread 730A of the plurality of producer threads 730A-B is configured to receive an offer request 740 associated with an item 750, and responsive to receiving the offer request 740, increase a producer sequence 760. The producer thread 730A is also configured to determine (i) an chunk identifier 762 (e.g., chunk ID), associated with the producer sequence 760, of an identified memory chunk 770 (e.g., expected memory chunk) from the plurality of memory chunks 710A-B and (ii) a position 764, from the producer sequence 760, in the identified memory chunk 770 (e.g., expected memory chunk) to offer the item 750. Additionally, the producer thread 730A is also configured to determine a first status 780A of the chunk identifier (e.g., chunk ID) as one of valid or invalid. The chunk identifier 762 is valid if the chunk identifier 762 (e.g., chunk ID) matches an identifier (e.g., identifier 785B) of a current memory chunk 790 of the plurality of memory chunks (note that memory chunk 710A is also associated with an identifier, such as identifier 785A). Responsive to determining the first status 780A of the chunk identifier 762 (e.g., chunk ID) as valid, the producer thread 730A is configured to write the item 750 into the identified memory chunk 770 (e.g., expected memory chunk) at the position 764. Responsive to determining the first status 780A of the chunk identifier (e.g., chunk ID) as invalid, the producer thread 730A is configured to read the current memory chunk 790 and determine a second status 780B of the current identifier 785B as greater than the chunk identifier 762 or less than the chunk identifier 762. Responsive to determining the second status 780B of the current identifier 785B as greater than the chunk identifier 762, the producer thread 730A is configured to walk backward from the current memory chunk 790 to the identified memory chunk (e.g., expected memory chunk) 770. Responsive to determining the second status 780B of the current identifier 785B as less than the chunk identifier 762, the producer thread 730A is configured to append a new memory chunk 710C to the current memory chunk 790 (e.g., memory chunk 710B).

Unlike other systems that use a single linked-list, for example a linked-list for concurrent ring queues ("CRQ"), the progressive chunked queue system 700 uses a double linked-list of chunks. For example, a producer processor or producer thread 730B that is lagging behind may advantageously keep-up by reaching the chunk of memory (e.g., memory chunk 710B) that will host that producer processor's "yet-to-be-offered" items. For example, the producer processor or producer thread may use the previous pointer from the last observed tail to navigate to the current chunk of memory (e.g., current memory chunk 790 or memory chunk 710B). Specifically, the moment at which a producer sequence 760 is incremented, another producer (e.g., producer thread 730B) can move forward and the producer threads (e.g., producer threads 730A-B) have the ability to move or walk backwards to reach previous slots (e.g., slot identified by position 764 in memory chunk 710A). The double linked-list of chunks advantageously involves less coordination between producer processors or producer threads (e.g., producer thread 730A-B) in order to remain in the appropriate memory chunk. For example, instead of each processor thread performing a CAS instruction, each of the processor threads (e.g., producer thread 730A-B) cooperate to reach an objective instead of competing. Additionally, using a double linked-list of chunks allows the disclosed systems and methods to use a single producer sequence 760 (instead of a producer sequence for each CRQ as with previous techniques), which makes it possible to monitor and observe the size of the queue and recognize when the queue is empty.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure a system includes a memory configured to store a plurality of memory chunks and a processor that is configured to execute a plurality of producer threads. A producer thread of the plurality of producer threads is configured to receive an offer request associated with an item, and responsive to receiving the offer request, increase a producer sequence. The producer thread is also configured to determine (i) an chunk identifier (e.g., chunk ID), associated with the producer sequence, of an identified memory chunk (e.g., expected memory chunk) from the plurality of memory chunks and (ii) a position, from the producer sequence, in the identified memory chunk (e.g., expected memory chunk) to offer the item. Additionally, the producer thread is also configured to determine a first status of the chunk identifier (e.g., chunk ID) as one of valid or invalid. The chunk identifier is valid if the chunk identifier (e.g., chunk ID) matches an identifier of a current memory chunk of the plurality of memory chunks. Responsive to determining the first status of the chunk identifier (e.g., chunk ID) as valid, the producer thread is configured to write the item into the identified memory chunk (e.g., expected memory chunk) at the position. Responsive to determining the first status of the chunk identifier (e.g., chunk ID) as invalid, the producer thread is configured to read the current memory chunk and determine a second status of the current identifier as greater than the chunk identifier or less than the chunk identifier. Responsive to determining the second status of the current identifier as greater than the chunk identifier, the producer thread is configured to walk backward from the current memory chunk to the identified memory chunk (e.g., expected memory chunk). Responsive to determining the second status of the current identifier as less than the chunk identifier, the producer thread is configured to append a new memory chunk to the current memory chunk.

In accordance with a 2nd exemplary aspect of the present disclosure, which may be used in combination with any one or more of the preceding aspects (e.g., the 1st aspect), the identifier is a memory chunk ID.

In accordance with a 3rd exemplary aspect of the present disclosure, which may be used in combination with any one or more of the preceding aspects (e.g., the 1st aspect), the identified memory chunk (e.g., expected memory chunk) includes a plurality of slots.

In accordance with a 4th exemplary aspect of the present disclosure, which may be used in combination with any one or more of the preceding aspects (e.g., the 3rd aspect), the plurality of slots is arranged in an array.

In accordance with a 5th exemplary aspect of the present disclosure, which may be used in combination with any one or more of the preceding aspects (e.g., the 3rd aspect), the position is a slot of the plurality of slots.

In accordance with a 6th exemplary aspect of the present disclosure, which may be used in combination with any one or more of the preceding aspects (e.g., the 1st aspect), the producer sequence is a counter that identifies an offer request.

In accordance with a 7th exemplary aspect of the present disclosure, which may be used in combination with any one or more of the preceding aspects (e.g., the 1st aspect), the new memory chunk is a newly allocated memory chunk.

In accordance with an 8th exemplary aspect of the present disclosure, which may be used in combination with any one or more of the preceding aspects (e.g., the 1st aspect), the new memory chunk is a reused pooled memory chunk.

In accordance with a 9th exemplary aspect of the present disclosure, which may be used in combination with any one or more of the preceding aspects (e.g., the 1st aspect), the producer thread is configured to write the item into the new memory chunk.

In accordance with a 10th exemplary aspect of the present disclosure, which may be used in combination with any one or more of the preceding aspects (e.g., the 1st aspect), the producer thread is configured to write the item into the identified memory chunk (e.g., expected memory chunk) after walking backward from the current memory chunk.

In accordance with an 11th exemplary aspect of the present disclosure, which may be used in combination with any one or more of the preceding aspects (e.g., the 1st aspect), the plurality of memory chunks forms an unbounded queue.

In accordance with a 12th exemplary aspect of the present disclosure, which may be used in combination with any one or more of the preceding aspects (e.g., the 1st aspect), the identified memory chunk (e.g., expected memory chunk) occupies at least two cache-lines.

In accordance with a 13th exemplary aspect of the present disclosure, which may be used in combination with any one or more of the preceding aspects (e.g., the 1st aspect), the producer sequence is a 64 bit integer.

In accordance with a 14th exemplary aspect of the present disclosure, which may be used in combination with any one or more of the preceding aspects (e.g., the 1st aspect), the identified memory chunk has a chunk size, and the chunk size is a fixed value.

In accordance with a 15th exemplary aspect of the present disclosure, which may be used in combination with any one or more of the preceding aspects (e.g., the 14th aspect), the chunk identifier (e.g., chunk ID) is determined by dividing the producer sequence by the chunk size.

In accordance with a 16th exemplary aspect of the present disclosure, which may be used in combination with any one or more of the preceding aspects (e.g., the 14th aspect), the position is determined by the producer sequence as a modulo of the producer sequence with the chunk size.

Aspects of the subject matter described herein may be useful alone or in combination with one or more other aspects described herein. In a 17th exemplary aspect of the present disclosure a method includes receiving, by a producer thread, an offer request associated with an item. Responsive to receiving the offer request, the producer thread increases a producer sequence. The producer thread determines (i) a chunk identifier (e.g., chunk ID) of an identified memory chunk (e.g., expected memory chunk) from the producer sequence and (ii) a position in the identified memory chunk (e.g., expected memory chunk) to offer the item from the producer sequence. Additionally, the producer thread determines a first status of the chunk identifier (e.g., chunk ID) as one of valid or invalid. The chunk identifier (e.g., chunk ID) is valid if the chunk identifier matches an identifier of a current memory chunk. Responsive to determining the first status of the chunk identifier (e.g., chunk ID) as valid, the producer thread writes the item into the identified memory chunk (e.g., expected memory chunk) at the position. Responsive to determining the first status of the chunk identifier (e.g., chunk ID) as invalid, the producer thread reads the current memory chunk and determine a second status of the current identifier as greater than the chunk identifier or less than the chunk identifier. Responsive to determining the second status of the current identifier as greater than the chunk identifier, the producer thread walks backward from the current memory chunk to the identified memory chunk (e.g., expected memory chunk). Responsive to determining the second status of the current identifier as less than the chunk identifier, the producer thread appends a new memory chunk to the current memory chunk.

In accordance with an 18th exemplary aspect of the present disclosure, which may be used in combination with any one or more of the preceding aspects (e.g., the 17th aspect), appending the new memory chunk includes allocating the new memory chunk to the plurality of memory chunks.

In accordance with a 19th exemplary aspect of the present disclosure, which may be used in combination with any one or more of the preceding aspects (e.g., the 17th aspect), the plurality of memory chunks are a pool of pre-allocated memory chunks.

In accordance with a 20th exemplary aspect of the present disclosure, which may be used in combination with any one or more of the preceding aspects (e.g., the 19th aspect), appending the new memory chunk includes reusing a memory chunk from the pool of pre-allocated memory chunks In accordance with a 21st exemplary aspect of the present disclosure, which may be used in combination with any one or more of the preceding aspects (e.g., the 17th aspect), the method further includes writing, by the producer thread, the item into the new memory chunk.

In accordance with a 22nd exemplary aspect of the present disclosure, which may be used in combination with any one or more of the preceding aspects (e.g., the 17th aspect), the method further includes writing, by the producer thread, the item into the identified memory chunk (e.g., expected memory chunk) after walking backward from the current memory chunk.

In accordance with a 23rd exemplary aspect of the present disclosure, which may be used in combination with any one or more of the preceding aspects (e.g., the 17th aspect), the producer sequence is a 64 bit integer.

In accordance with a 24th exemplary aspect of the present disclosure, which may be used in combination with any one or more of the preceding aspects (e.g., the 23rd aspect), the identified memory chunk has a chunk size, and the chunk size is a fixed value.

In accordance with a 25th exemplary aspect of the present disclosure, which may be used in combination with any one or more of the preceding aspects (e.g., the 24th aspect), the chunk identifier (e.g., chunk ID) is determined by dividing the producer sequence by the chunk size.

In accordance with a 26th exemplary aspect of the present disclosure, which may be used in combination with any one or more of the preceding aspects (e.g., the 24th aspect), the position is determined by the producer sequence as a modulo of the producer sequence with the chunk size.

Aspects of the subject matter described herein may be useful alone or in combination with one or more other aspects described herein. In a 27th exemplary aspect of the present disclosure a non-transitory machine readable medium stores code, which when executed by a processor, is configured to cause a producer thread to receive an offer request associated with an item and responsive to receiving the offer request, increase a producer sequence. The non-transitory machine-readable medium is also configured to determine (i) a chunk identifier (e.g., chunk ID) of an identified memory chunk (e.g., expected memory chunk) from the producer sequence and (ii) a position in the identified memory chunk (e.g., expected memory chunk) to offer the item from the producer sequence. Additionally, the non-transitory machine-readable medium is configured to determine a first status of the chunk identifier (e.g., chunk ID) as one of valid or invalid. The chunk identifier (e.g., chunk ID) is valid if the chunk identifier matches an identifier of a current memory chunk. Responsive to determining the first status of the chunk identifier (e.g., chunk ID) as valid, the non-transitory machine-readable medium is configured to write the item into the identified memory chunk (e.g., expected memory chunk) at the position. Responsive to determining the first status of the chunk identifier (e.g., chunk ID) as invalid, the non-transitory machine readable medium is configured to read the current memory chunk and determine a second status of the current identifier as greater than or equal to the chunk identifier (e.g., expected chunk identifier) or less than the chunk identifier (e.g., expected chunk identifier). Responsive to determining the second status of the current identifier as greater than or equal to the chunk identifier (e.g., expected chunk identifier), the non-transitory machine-readable medium is configured to walk backward from the current memory chunk to the identified memory chunk (e.g., expected memory chunk). Responsive to determining the second status of the current identifier as less than the chunk identifier (e.g., expected chunk identifier), the non-transitory machine-readable medium is configured to append a new memory chunk to the current memory chunk.

Aspects of the subject matter described herein may be useful alone or in combination with one or more other aspects described herein. In a 28th exemplary aspect of the present disclosure a system includes a pool or doubly linked list of memory chunks and a least one processor (a memory may be configured to store the pool of memory chunks). The pool or double linked list of memory chunks includes a plurality of slots including an initial slot and an end slot. The at least one processor configured to execute a plurality of producer threads and at least one consumer thread. A producer thread of the plurality of producer threads is configured to receive an offer request associated with an item and responsive to receiving the offer request, increase a producer sequence. The producer thread is also configured to determine (i) a chunk identifier (e.g., chunk ID), associated with the producer sequence, of a memory chunk from the pool or doubly linked list of memory chunks and (ii) a slot position, from the producer sequence, in the memory chunk to offer the item. The producer thread is also configured to write the item into the memory chunk at the slot position. The at least one consumer thread is configured to determine the slot position of the item, consume the item at the slot position, determine the status of the slot position as an intermediate slot or the end slot, and responsive to determining the slot position as the end slot, detach the memory chunk to remove the memory chunk from the pool or doubly linked list of memory chunks.

In accordance with a 29th exemplary aspect of the present disclosure, which may be used in combination with any one or more of the preceding aspects (e.g., the 28th aspect), the identifier is a memory chunk ID.

In accordance with a 30th exemplary aspect of the present disclosure, which may be used in combination with any one or more of the preceding aspects (e.g., the 28th aspect), plurality of slots are arranged in an array.

In accordance with a 31st exemplary aspect of the present disclosure, which may be used in combination with any one or more of the preceding aspects (e.g., the 28th aspect), the producer sequence is a counter that identifies an offer request.

In accordance with a 32nd exemplary aspect of the present disclosure, which may be used in combination with any one or more of the preceding aspects (e.g., the 28th aspect), the producer thread is configured to reallocate the detached memory chunk to the pool or doubly linked list of memory chunks.

In accordance with a 33rd exemplary aspect of the present disclosure, which may be used in combination with any one or more of the preceding aspects (e.g., the 32nd aspect), the producer thread is configured to write additional items into the memory chunk.

In accordance with a 34th exemplary aspect of the present disclosure, which may be used in combination with any one or more of the preceding aspects (e.g., the 33rd aspect), the consumer thread is configured to consume the additional items from the memory chunk.

In accordance with a 35th exemplary aspect of the present disclosure, which may be used in combination with any one or more of the preceding aspects (e.g., the 28th aspect), the doubly linked list of memory chunks form an unbounded queue.

In accordance with a 36th exemplary aspect of the present disclosure, which may be used in combination with any one or more of the preceding aspects (e.g., the 28th aspect), the memory chunk occupies at least two cache-lines.

Aspects of the subject matter described herein may be useful alone or in combination with one or more other aspects described herein. In a 37th exemplary aspect of the present disclosure a method includes receiving, by a producer thread, an offer request associated with an item. Responsive to receiving the offer request, the method includes increasing, by the producer thread, a producer sequence. The method also includes determining, by the producer thread, (i) a chunk identifier (e.g., chunk ID), associated with the producer sequence, of a memory chunk from a pool or doubly linked list of memory chunks and (ii) a slot position, from the producer sequence, in the memory chunk to offer the item. Additionally, the method includes writing, by the producer thread, the item into the memory chunk at the slot position. The method also includes determining, by a consumer thread, the slot position of the item, consuming, by the consumer thread, the item at the slot position, and determining, by the consumer thread, the status of the slot position as an intermediate slot or the end slot. Responsive to determining the slot position as the end slot, the method includes detaching the memory chunk to remove the memory chunk from the pool or doubly linked list of memory chunks.

In accordance with a 38th exemplary aspect of the present disclosure, which may be used in combination with any one or more of the preceding aspects (e.g., the 37th aspect), the method further includes reallocating, by one of the producer thread and the consumer thread, the detached memory chunk back to the pool or doubly linked list of memory chunks.

In accordance with a 39th exemplary aspect of the present disclosure, which may be used in combination with any one or more of the preceding aspects (e.g., the 38th aspect), the method further includes writing, by the producer thread, additional items into the memory chunk.

In accordance with a 40th exemplary aspect of the present disclosure, which may be used in combination with any one or more of the preceding aspects (e.g., the 39th aspect), the method further includes consuming, by the consumer thread, the additional items from the memory chunk.

Aspects of the subject matter described herein may be useful alone or in combination with one or more other aspects described herein. In a 41st exemplary aspect of the present disclosure a non-transitory machine readable medium stores code, which when executed by a processor, is configured to cause at least one of a producer thread and a consumer thread to receive an offer request associated with an item and responsive to receiving the offer request, increase a producer sequence. The non-transitory machine readable medium is also configured to determine (i) a chunk identifier (e.g., chunk ID), associated with the producer sequence, of a memory chunk from a pool or doubly linked list of memory chunks and (ii) a slot position, from the producer sequence, in the memory chunk to offer the item. Additionally, the non-transitory machine-readable medium is configured to write the item into the memory chunk at the slot position, determine the slot position of the item, consume the item at the slot position, and determine the status of the slot position as an intermediate slot or the end slot. Responsive to determining the slot position as the end slot, the non-transitory machine-readable medium is configured to detach the memory chunk to remove the memory chunk from the pool or doubly linked list of memory chunks.

Aspects of the subject matter described herein may be useful alone or in combination with one or more other aspects described herein. In a 42nd exemplary aspect of the present disclosure a system includes a means for receiving an offer request associated with an item, a means for increasing a producer sequence responsive to receiving the offer request, and a first means for determining (i) an chunk identifier (e.g., chunk ID) of an identified memory chunk (e.g., expected memory chunk) from the producer sequence and (ii) a position in the identified memory chunk (e.g., expected memory chunk) to offer the item from the producer sequence. The system also includes a second means for determining a first status of the chunk identifier (e.g., chunk ID) as one of valid or invalid. The chunk identifier (e.g., chunk ID) is valid if the chunk identifier matches the identifier of the current memory chunk. Additionally, the system includes a means for writing the item into the identified memory chunk (e.g., expected memory chunk) at the position responsive to determining the first status of the chunk identifier (e.g., chunk ID) as valid, a means for reading the current memory chunk and determine a second status of the current identifier as greater than or equal to the expected chunk identifier or less than the expected chunk identifier responsive to determining the first status of the chunk identifier (e.g., chunk ID) as invalid, a means for walking backward from the current memory chunk to the identified memory chunk (e.g., expected memory chunk) responsive to determining the second status of the current identifier as greater than or equal to the expected chunk identifier, and a means for appending a new memory chunk to the current memory chunk responsive to determining the second status of the current identifier as less than the expected chunk identifier Aspects of the subject matter described herein may be useful alone or in combination with one or more other aspects described herein. In a 43rd exemplary aspect of the present disclosure a system includes a means for receiving an offer request associated with an item, a means for increasing a producer sequence responsive to receiving the offer request, and a first means for determining (i) an chunk identifier (e.g., chunk ID), associated with the producer sequence, of a memory chunk from a pool or doubly linked list of memory chunks and (ii) a slot position, from the producer sequence, in the memory chunk to offer the item. The system also includes a means for writing the item into the memory chunk at the slot position, a second means for determining the slot position of the item, a means for consuming the item at the slot position, a third means for determining the status of the slot position as an intermediate slot or the end slot, and a means for detaching the memory chunk to remove the memory chunk from the pool or doubly linked list of memory chunks responsive to determining the slot position as the end slot.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory configured to store a plurality of memory chunks; and
a processor configured to execute a plurality of producer threads, wherein a producer thread of the plurality of producer threads is configured to:
receive an offer request associated with an item,
responsive to receiving the offer request, increase a producer sequence,
determine (i) a chunk identifier, associated with the producer sequence, of an identified memory chunk from the plurality of memory chunks and (ii) a position, from the producer sequence, in the identified memory chunk to offer the item,
determine a first status of the chunk identifier as one of valid or invalid, wherein the chunk identifier is valid if the chunk identifier matches an identifier of a current memory chunk of the plurality of memory chunks,
responsive to determining the first status of the chunk identifier as (i) valid, write the item into the identified memory chunk at the position, and (ii) as invalid, read the current memory chunk and determine a second status of the current identifier as greater than or equal to the chunk identifier or less than the expected chunk identifier, and
responsive to determining the second status of the current identifier as (i) greater than or equal to the chunk identifier, walk backward from the current memory chunk to the identified memory chunk, and (ii) as less than the chunk identifier, append a new memory chunk to the current memory chunk.

2. The system of claim 1, wherein the identifier is a memory chunk ID.

3. The system of claim 1, wherein the identified memory chunk includes a plurality of slots.

4. The system of claim 3, wherein the plurality of slots is arranged in an array.

5. The system of claim 3, wherein the position is a slot of the plurality of slots.

6. The system of claim 1, wherein the producer sequence is a counter that identifies an offer request.

7. The system of claim 1, wherein the new memory chunk is a newly allocated memory chunk.

8. The system of claim 1, wherein the new memory chunk is a reused pooled memory chunk.

9. The system of claim 1, wherein the producer thread is configured to write the item into the new memory chunk.

10. The system of claim 1, wherein the producer thread is configured to write the item into the identified memory chunk after walking backward from the current memory chunk.

11. The system of claim 1, wherein the plurality of memory chunks forms an unbounded queue.

12. The system of claim 1, wherein the identified memory chunk occupies at least two cache-lines.

13. The system of claim 1, wherein the producer sequence is a 64 bit integer.

14. The system of claim 1, wherein the identified memory chunk has a chunk size, and the chunk size is a fixed value.

15. The system of claim 14, wherein the chunk identifier is determined by dividing the producer sequence by the chunk size and the position is determined by the producer sequence as a modulo of the producer sequence with the chunk size.

16. A method comprising:

receiving, by a producer thread, an offer request associated with an item;

responsive to receiving the offer request, increasing, by the producer thread, a producer sequence;

determining, by the producer thread, (i) an chunk identifier of an identified memory chunk from the producer sequence and (ii) a position in the identified memory chunk to offer the item from the producer sequence;

determining, by a producer thread, a first status of the chunk identifier as one of valid or invalid, wherein the chunk identifier is valid if the chunk identifier matches the identifier of the current memory chunk;

responsive to determining the first status of the chunk identifier as (i) valid, writing, by a producer thread, the item into the identified memory chunk at the position, and (ii) as invalid, reading, by a producer thread, the current memory chunk and determine a second status of the current identifier as greater than or equal to the chunk identifier or less than the chunk identifier; and responsive to determining the second status of the current identifier as (i) greater than or equal to the chunk identifier, walking, by a producer thread, backward from the current memory chunk to the identified memory chunk, and (ii) less than the chunk identifier, appending, by a producer thread, a new memory chunk to the current memory chunk.

* * * * *